(12) United States Patent
Ohman et al.

(10) Patent No.: US 9,706,056 B2
(45) Date of Patent: Jul. 11, 2017

(54) PARTICIPANT-SPECIFIC VOLUME CONTROL

(71) Applicant: Genband US LLC, Frisco, TX (US)

(72) Inventors: Todd Olof Ohman, Almonte (CA); Dany Sylvain, Gatineau (CA)

(73) Assignee: Genband US LLC, Plano, TX (US)

( * ) Notice: Subject to any disclaimer, the term of this patent is extended or adjusted under 35 U.S.C. 154(b) by 118 days.

(21) Appl. No.: 14/695,616

(22) Filed: Apr. 24, 2015

(65) Prior Publication Data

US 2016/0316064 A1    Oct. 27, 2016

(51) Int. Cl.
*G06F 17/00* (2006.01)
*H04M 3/56* (2006.01)
*G06F 3/16* (2006.01)

(52) U.S. Cl.
CPC ............ *H04M 3/568* (2013.01); *G06F 3/165* (2013.01); *H04M 3/561* (2013.01)

(58) Field of Classification Search
CPC ................................. H04M 3/56; H04M 3/568
See application file for complete search history.

(56) References Cited

U.S. PATENT DOCUMENTS

| | | | |
|---|---|---|---|
| 2003/0112947 A1* | 6/2003 | Cohen .................... | H04L 29/06 379/202.01 |
| 2005/0152524 A1* | 7/2005 | Carlson .................. | H04M 3/56 379/202.01 |
| 2006/0026521 A1* | 2/2006 | Hotelling .............. | G06F 3/0418 715/702 |

* cited by examiner

*Primary Examiner* — Joseph Saunders, Jr.
(74) *Attorney, Agent, or Firm* — Haynes and Boone, LLP

(57) ABSTRACT

A method performed by a computing system includes managing an audio communication session that includes an audio connection between a plurality of participant devices, associating with each of the plurality of participant devices, a volume adjustment factor, adjusting a volume of an audio out signal from a first participant device of the plurality of participant devices to create an adjusted audio out signal, the adjusting being based on the volume adjustment factor associated with the first participant device, and transmitting a conference audio signal based on the adjusted audio out signal to a subset of the plurality of participant devices.

20 Claims, 8 Drawing Sheets

PARTICIPANT-SPECIFIC VOLUME CONTROL

BACKGROUND

The present disclosure relates generally to communication management, and more particularly to methods and systems for participant-specific volume control.

People often communicate using various types of media. For example, people may engage in voice communication over the phone, whether by a landline, mobile phone, or voice over internet protocol (VOIP) applications. Additionally, users may use email, video conferencing, screen sharing (or other real-time collaborative communication applications), instant messaging applications and other types of media for communication.

In general, when multiple people are communicating with each other over various types of conference systems, different people are often connecting from different types of devices over different types of connections. For example, one participant may call in through a landline telephone from his or her work office. Another participant may call into the conference through a smartphone connected over a mobile phone network. Another conference participant may connect with his or her laptop computer via his or her home internet connection. Each of these different devices may cause different participants to exhibit different volume levels when they speak. Further, each conference participant may naturally have a different loudness when speaking.

Conventional systems typically allow a user to adjust the volume on his or her communication device. While this allows the user to better hear the quietest participant, it often causes the loudest participant to be too loud. This may be a source of frustration for the user. Thus, it is desirable to provide methods and systems that provide a better user experience for various communication applications.

SUMMARY

According to one example, a method performed by a computing system includes managing an audio communication session that includes an audio connection between a plurality of participant devices, associating with each of the plurality of participant devices, a volume adjustment factor, adjusting a volume of an audio out signal from a first participant device of the plurality of participant devices to create an adjusted audio out signal, the adjusting being based on the volume adjustment factor associated with the first participant device, and transmitting a conference audio signal based on the adjusted audio out signal to a subset of the plurality of participant devices.

According to one example, a method performed by a computing system includes managing an audio communication session that includes an audio connection between a plurality of participant devices, and designating one of the plurality of participant devices as an active participant device for a particular instance in time. The method further includes receiving, from a first participant device of the plurality of participant devices, a first set of volume adjustment factors, the first set of volume adjustment factors being specific to the first participant device, each volume adjustment factor of the first set being associated with a different participant device of the audio communication session. The method further includes determining which one of the plurality of participant devices is the active participant device, and adjusting a volume level of a conference audio signal being sent to the first participant device based on the volume adjustment factor, of the first set, associated with the active participant device.

According to one example, a conference bridge includes a control module configured to receive, for each participant device of a plurality of participant devices engaged in a communication session, a set of volume adjustment factors, each volume adjustment factor within the set defining volume adjustment for a different participant device within the communication session, and adjust a volume of audio out signals to create adjusted audio out signals for each of the plurality of participant devices based on the volume adjustment factor associated with each respective participant device. The conference bridge further includes a source selection module to receive the adjusted audio out signals and a broadcast module to transmit, as audio in signals, a conference audio signal based on the adjusted audio out signals to each of the plurality of participant devices.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, conventional systems typically allow a user to adjust the volume on his or her communication device. While this allows the user to better hear the quietest participant, it often causes the loudest participant to be too loud. This may be a source of frustration for the user. Thus, it is desirable to provide methods and systems that provide a better user experience for various communication applications.

According to one example of principles described herein, a conference bridge is configured to provide participant-specific volume control. Specifically, during a communication session involving multiple participant devices, a user of the managing participant device can adjust the volume of each participant device. The users of each participant device will thus hear the other users according to how the user of the managing participant device has set the volume control for each participant device. The user of the managing participant device may set the volume for each participant so that each user hears the other users at a substantially similar level. Volume management rights may be distributed to a single host only, but in other embodiments volume management rights may be granted to some or all non-host users.

In some cases, different users may have different preferences for how to control the volume of other users. Thus, in some examples, a conference bridge may provide individualized participant-specific volume control. This means that volume adjustment of conference participants is specific to a particular user. For example, user A may wish to raise the volume for user C, but user B may not wish to do so. Using the individualized participant-specific volume control, user A and user B can adjust their respective volume control settings so that when user C speaks, user A hears user C at a higher volume than user B hears user C.

Figure 1:
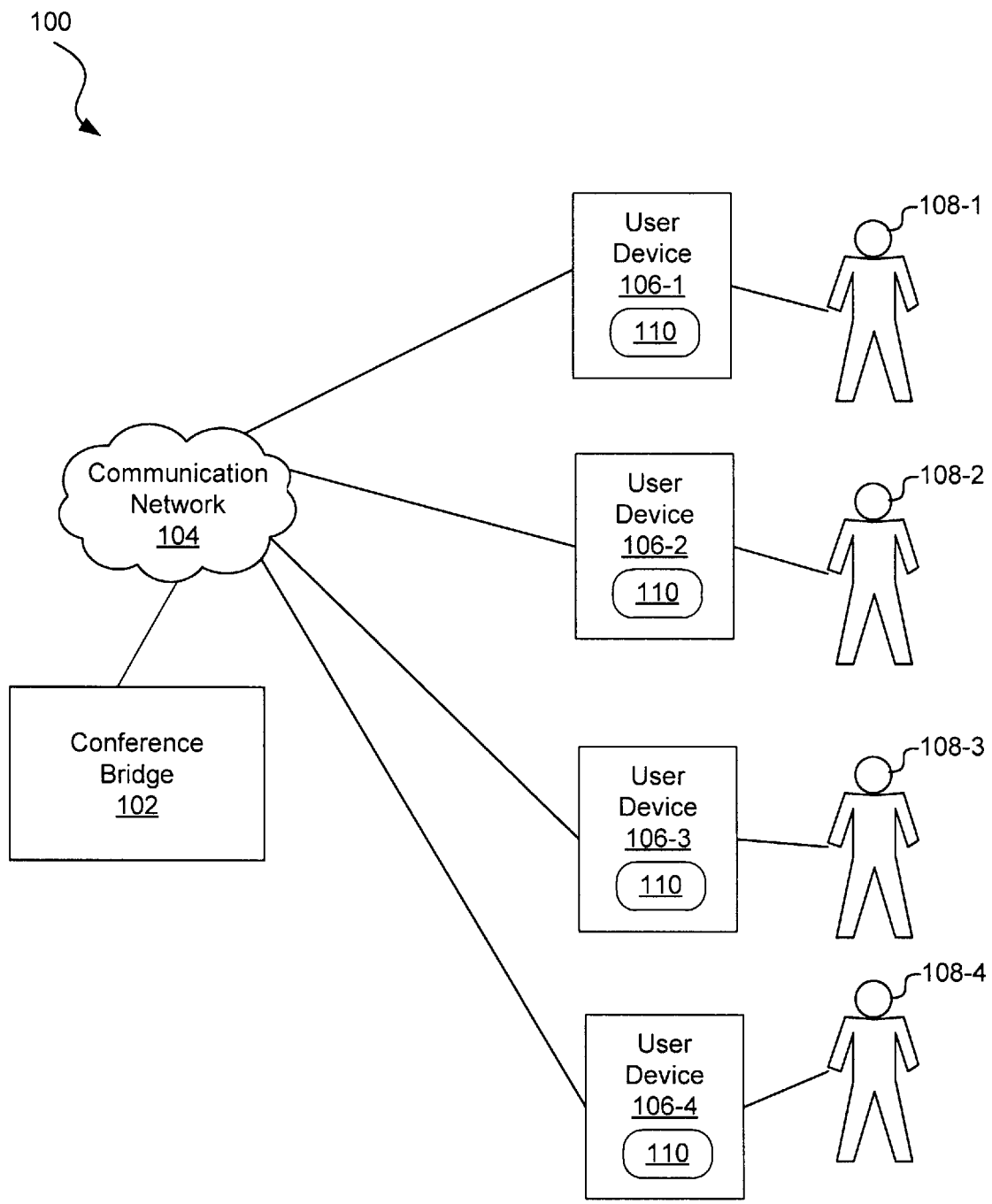
FIG. 1 is a diagram showing an illustrative communication environment in which multiple users may communicate, according to one example of principles described herein.

FIG. 1 is a diagram showing an illustrative communication environment 100 in which multiple users 108 communicate using various types of media, including audio. According to the present example, the communication environment 100 includes a conference bridge 102 and a number of participant devices 106. Each participant device 106 is associated with a particular user 108. The participant devices 106 are configured to communicate over the communication network 104 with the conference bridge 102.

The conference bridge 102 includes software and hardware that is configured to host and manage communication sessions between multiple participant devices 106. Specifically, the conference bridge 102 may establish connections over various types of communication media to the plurality of participant devices 106. In one example, the conference bridge 102 is part of a computer server. The conference bridge 102 may be invoked to perform certain tasks in a variety of situations. For example, when a communication session between at least two participant devices 106 is first initiated, the conference bridge 102 establishes the communication connections between those two participant devices 106. When a new participant device 106 is added to the communication session, the conference bridge 102 establishes communication connections between the current participant devices 106 and the new participant device 106. When a participant device 106 leaves the communication session, the conference bridge 102 tears down the communication connections between the participant device 106 that is leaving the communication session and the remaining participant devices 106.

The communication network 104 may include one or more types of networks involving multiple types of physical media and transport protocols. For example, the communication network 104 may include a Local Area Network (LAN) using Ethernet, wireless, and fiber optic connections. The communication network 104 may also include the Internet. The communication network 104 may include both packet switched networks and circuit switched networks such as a Public Switched Telephone Network (PSTN). The communication network 104 may use various transmission protocols such as Real-time Transfer Protocol (RTP), Session Initiation Protocol (SIP), and Hypertext Transfer Protocol (HTTP) to transmit data in the form of packets between participant devices 106. The communication network 104 may also include mobile data networks such as Long Term Evolution (LTE) networks. The communication connections made between the participant device 106 and the conference bridge 102 may be made over any combination of such communication networks. The scope of embodiments is not limited to any particular network technology for use as, or in, communication network 104.

The participant devices 106 may include a variety of different devices such as desktop computers, laptop computers, tablet computing devices, mobile smart phones, desktop phones, and others. Different participant devices 106 may have different audio related hardware and thus provide different qualities of audio. For example, some devices may have more advanced microphones that more clearly pick up a user's voice and other sounds. Some devices may have simpler microphones that less clearly pick up a user's voice and other sounds.

Each participant device 106 has a mechanism for communicating with the conference bridge 102 for purposes other than media communication. For example, a participant device may include an application 110 that sends command signals and other data to the conference bridge 102. Such command signals may be to change the volume setting. The command signals may be sent using a variety of protocols, including HyperText Transfer Protocol (HTTP), Session Initiation Protocol (SIP), Extensible Messaging and Presence Protocol (XMPP), Simple Object Access Protocol (SOAP), or Representational State Transfer (REST). In some examples, the communication applications 110 are similar across participant devices 106. For example, the communication applications 110 may be provided by the same vendor and may be designed for use with the conference bridge 102, which is also provided by the same vendor. In some cases, however, some participant devices 106 may have third-party communication applications 110 installed thereon. The conference bridge 102 may be configured to work with such third-party applications. In some cases, the mechanism that allows standard phones to communicate with the conference bridge is Dual-Tone Multi-Frequency (DTMF) signaling. More detail on DTMF signaling will be provided below.

Each participant device 106 may be associated with a specific user 108. For example, the first participant device 106-1 is associated with the first user 108-1, the second participant device 106-2 is associated with the second user 108-2, the third participant device 106-3 is associated with the third user 108-3, and the fourth participant device 106-4 is associated with the fourth user 108-4. In one example, each user 108 is associated with a unique identification string such as a SIP username. Thus, when a user of one participant device 106 wishes to contact another user, he or she can use that user's unique identification string to make such contact. The conference bridge 102 can associate a user's unique identification string with a protocol address associated with that user's participant device. For example, the conference bridge may associate a user's unique identification number with a specific Media Access Control (MAC) address or an Internet Protocol (IP) address. In some cases, the associated user 108 may simply be a user that responds to a communication request on a given participant device 106.

In some examples, a user 108 has an account registered with the conference bridge 102. The user 108 may access his or her account through any participant device 106 having the multimedia communication application 110 installed thereon. When a user logs in through the multimedia communication application 110 of a specific participant device 106, the conference bridge 102 can register that participant device 106 with the unique identification number for that user 108. Thus, when anyone attempts to start a multimedia conversation with that user 108, the packet stream will be directed to the proper participant device 106. Furthermore, although not shown herein, a single user may be associated with, or logged-in at, more than one participant device 106 at a time.

In some examples, the conference bridge 102 and some of the communication applications 110 may be associated with a particular platform. For example, a communication application 110 and the conference bridge 102 may be designed and provided by the same entity. But, some of the communication applications 110 may be provided by a different entity. The conference bridge 102 can be designed to establish communication connections with participant devices 106 that have communication applications 110 that are not designed and provided by the same entity that provides the conference bridge 102. Thus, the conference bridge 102 can work with communication applications 110 and devices 106 outside the platform associated with the conference bridge 102.

Figure 2:
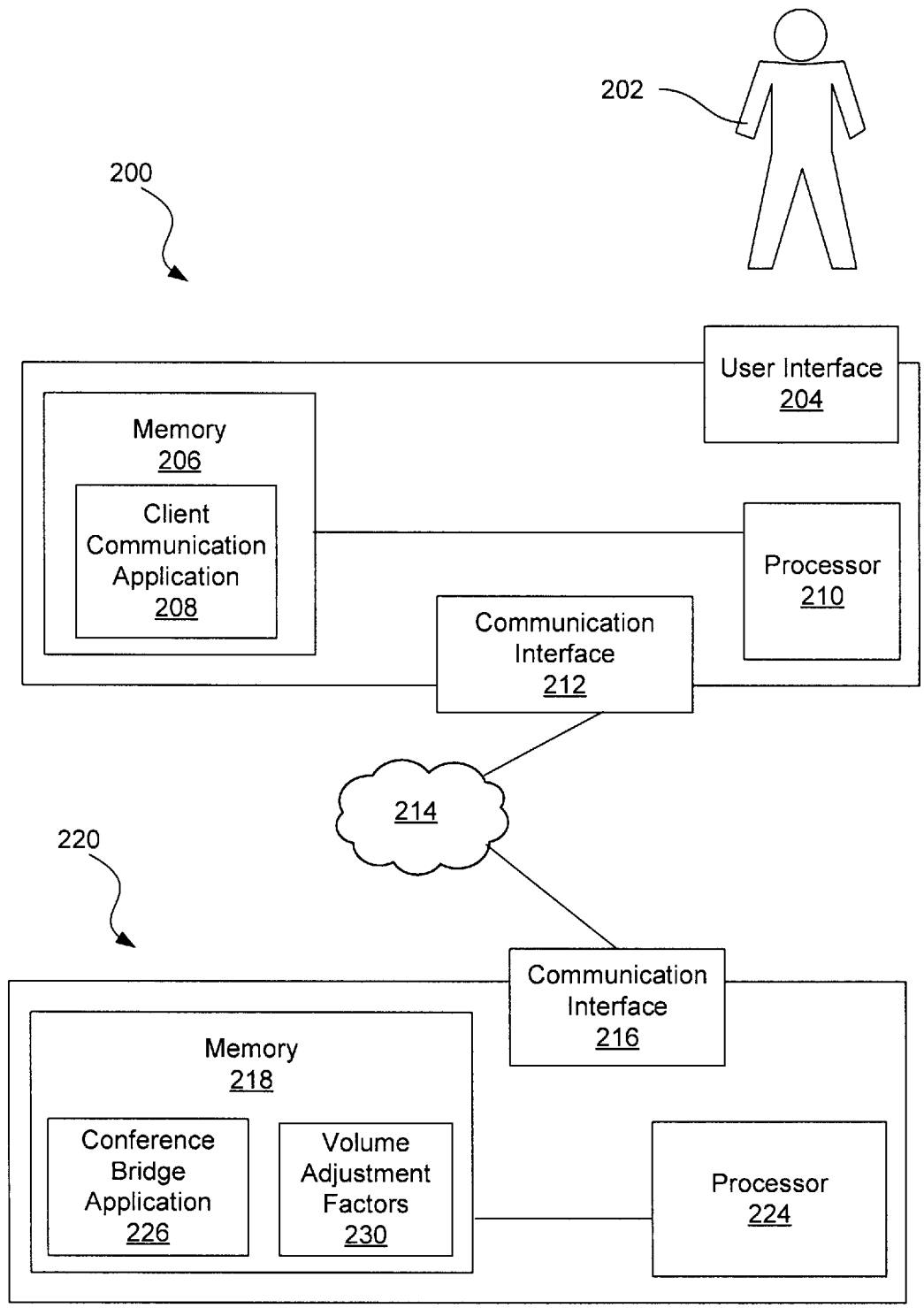
FIG. 2 is a diagram showing an illustrative connection between a conference bridge and a participant device, according to one example of principles described herein.

FIG. 2 is a diagram showing an illustrative connection between a conference bridge (e.g. 102, FIG. 1) and a participant device (e.g. 106, FIG. 1). According to the present example, the client system 200 may be a participant device such as a desktop computer, laptop computer, smartphone device, desktop phone, or tablet device. The server system 220 can also include any appropriate hardware such as a general purpose computer or other device. An example server includes a multi-processor general purpose computer running an operating system such as Linux. The server system 220 may facilitate communication between various participant devices operated by different users having the client communication application 208 installed thereon. The server system 220 runs the conference bridge application 226 that performs the functions of hosting and managing a communication session as described herein.

According to certain illustrative examples, the client system 200 includes a memory 206 which may include software such as the client communication application 208. The client system 200 also includes a processor 210, a communication interface 212, and a user interface 204.

The memory 206 may be one of several different types of memory. Some types of memory, such as non-volatile types of memory, typically have large storage volume but relatively slow performance. Volatile memory, such as those used for Random Access Memory (RAM), are optimized for speed and are often referred to as "working memory." The server memory 218 may also include various types of memory such as volatile or non-volatile memory. In some embodiments, the software is stored as computer-readable code in memory 206, 218 and executed by processors 210 and 224 respectively.

The client system 200 also includes a processor 210 for executing software and using or updating data stored in memory 206. The software may include an operating system and various other software applications. For example, the client system includes the client communication application 208, which may be similar to the communication application 110 described in FIG. 1. In addition to the communication application 208, the client device 200 may include other software such as other communication applications, which may interface with the communication application, and other productivity applications such as word processing and web browsing.

The user interface 204 may include a number of input devices such as a mouse, touchpad, or touchscreen that allow the user 202 to interact with a GUI. The user interface 204 may also include a number of different types of output devices such as a monitor or a touchscreen. In the case of a standard phone, the user interface may simply include a set of buttons, including a dialing pad. The user interface allows the user 202 to interact with the client system 200. The user interface 204 may include hardware such as a keyboard, mouse, touchscreen, or other physical buttons. The user interface 204 may also include the software that provides the graphical user interface and various features associated therewith. For example, the graphical user interface may display features such as a volume control object.

The communication interface 212 may include hardware and software that allows the client system 200 to communicate with other devices over a network 214. The network interface 212 may be designed to communicate with the network 214 through wired media or wireless media as appropriate. Examples of networks for use in system 214 include the Internet, a LAN, a cellular network or any other appropriate network.

According to certain illustrative examples, the server system 220 includes a memory 218 and a processor 224. The memory 218 may have stored thereon the conference bridge application 226. The server system 220 also includes a communication interface 216 for communicating with other devices such as the client system 200. The conference bridge application 226 may be similar to the conference bridge 102 described above. In some examples, the implementation of the features described above may be distributed between the server side application 226 and the client side application 208 in a variety of ways.

Figure 3:
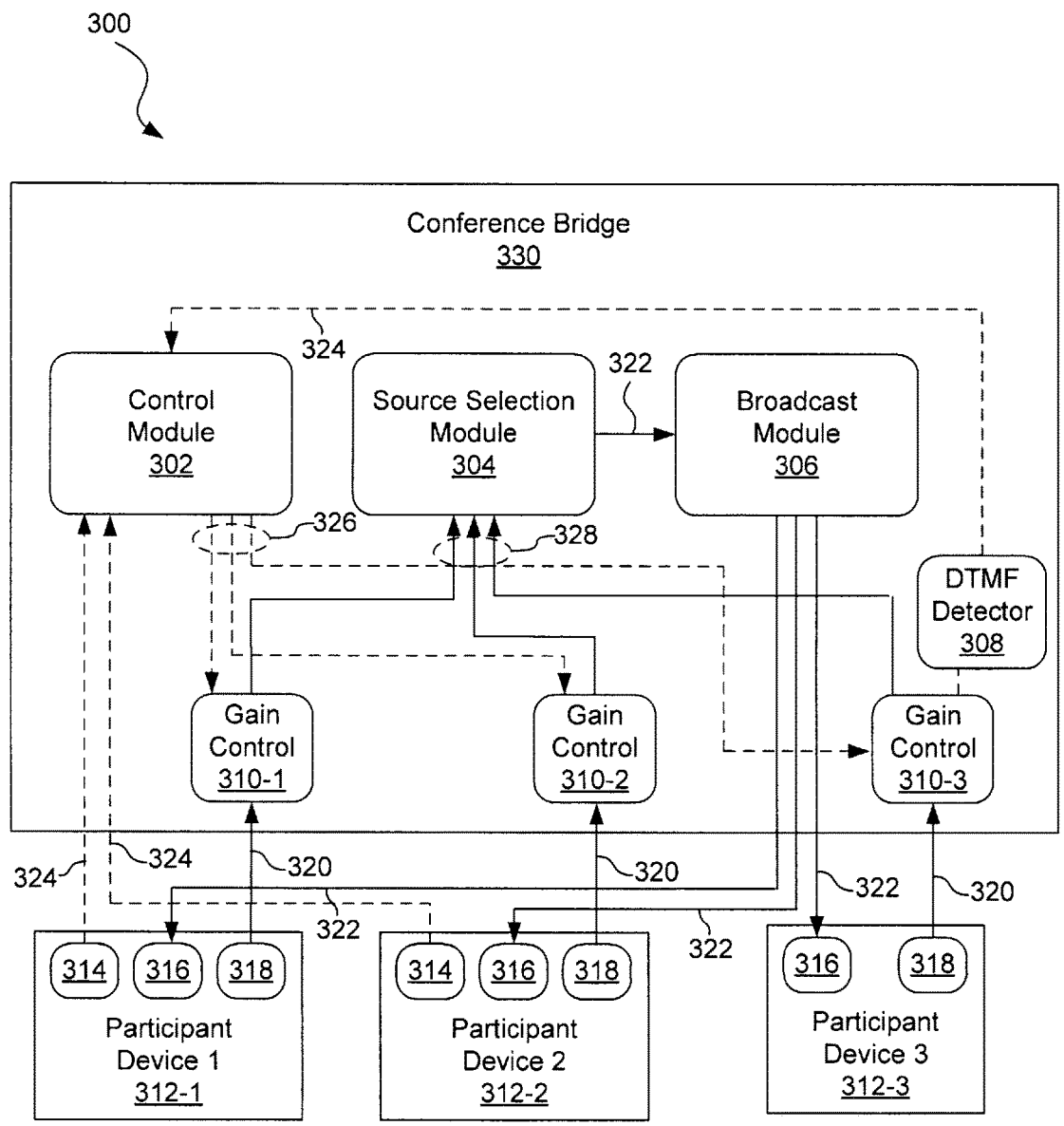
FIG. 3 is a diagram showing illustrative components of a conference bridge that provides collective participant-specific volume control, according to one example of principles described herein.

FIG. 3 is a diagram showing illustrative components of a conference bridge 330 that provides collective participant-specific volume control. According to one example of principles described herein, a plurality of participant devices 312, each operated by a different user, are engaged in a communication session that includes an audio component. Other media, such as video or screen sharing, may be included with the communication session as well. One of the participant devices 312 is referred to as the managing participant device, and is given the ability to control the volume for each of the participant devices 312. To change the volume for different participant devices 312, a volume adjustment factor is defined and associated with each participant device 312. The audio out signal 320 for a participant device 312 is received by a conference bridge 330. That audio out signal 320 is then adjusted based on the volume adjustment factor associated with that participant device 312 to create an adjusted audio out signal 328. That adjusted audio out signal 328 is then further processed by the conference bridge 330 to be broadcasted to all other participant devices 312. Each respective one of the audio output signals 320 may be adjusted separately.

Thus, if the audio out signal 320 from a particular participant device 312 is lower in volume than the audio out signals 320 of other participant devices 312, the volume adjustment factor can be set to raise that participant device's 312 audio out signal 320, and only that participant device's 312 audio out signal 320. Conversely, if the audio out signal from a particular participant device 312 is higher in volume than the audio out signals 320 of the other participant devices 312, the volume adjustment factor for that participant device 312 can be set to lower the volume of that participant device's 312 audio out signal. Thus, the user of the managing participant device 312 can set the volume control for each participant device 312 so that the users of each participant device 312 hear the other users at a substantially similar volume level.

According to the present example, a number of participant devices 312 are in communication with a conference bridge 330. A participant device 312 may be, for example, a standard phone, a smartphone, a tablet, a laptop computer, etc. Each participant device 312 includes an output module 316 and an input module 318. Some participant devices 312 include a control application 314 for sending commands to the conference bridge 330. In some examples, the control application may be on a different device associated with a participant device 312. For example, the participant device 312 may be a phone that is associated with a computer or tablet device running the control application 314 that is linked or otherwise associated with the phone.

The output module 316 includes hardware, software, or a combination of both that is configured to process an audio signal and provide that audio signal to a user of the participant device 312. For example, an output module 316 may include a speaker. The output module 316 may also include a digital-to-analog converter that converts a data signal, such as signal 322, into an analog signal for use by the speaker.

The input module 318 includes hardware, software, or a combination of both that is configured to sample a user's voice or other sounds and send the data representing such sounds as an audio out signal 320. For example, the input module 318 may include a microphone. The input module 318 may also include an analog-to-digital converter that converts the analog signal of the user's voice to a digital signal for transmission over a communication network. Input module 318 may also include encoder and network communications hardware and software. For example, for encoding audio data, packetizing audio data, and transmitting packets or other data formats across a network. Similarly, out to module 316 may also include network connection hardware and software for depacketizing data received from the network, and decoding encoded audio. FIG. 3 omits the network connections for simplicity, but it is understood that the devices and modules shown in FIG. 3 may be arranged according to the architectures of FIGS. 1 and 2.

A participant device 312 that has computing capability may include a control application 314 that sends commands to the conference bridge 330. Such commands may be made available to the managing participant device 312. Such commands may include muting one of the participants or changing the volume of one of the participants.

Because the various participant devices 312 may have different pieces of hardware or software that perform the functions of both the input modules 316 and output module 318, the voice of some users may be less than others during a conference call. Additionally, some users may inherently have a quieter or louder voice than others. Thus, it is desirable to be able to separately control the volume for each participant.

According to the present example, the conference bridge 330 includes a control module 302, a source selection module 304, and a broadcast module 306. The conference bridge 330 may be similar to the conference bridge 102 described above. The conference bridge 330 is configured to establish communication connections to the participant devices 312 in order to host and manage a communication session that includes an audio component.

The control module 302 includes a combination of software and hardware that is configured to receive and process command signals 324 from participant devices 312. As described above one of the participant devices 312 is designated as a managing participant device 312. In this example, participant device 312-1 is the managing participant device 312. In one example, the participant device 312 of the user who initiated the audio communication session is automatically designated the managing participant device 312. The management role may be provided by other participant devices 312 as well.

The command signals 324 received by the control module 302 may include a variety of commands such as to add a new participant device 312, remove a current participant device 312, or mute a particular participant device 312. The command signals 324 also include instructions to change the volume of a particular participant device 312. For example, managing participant device 312-1 may send a command signal 324 to lower the volume for participant device 312-2. In response, the control module 302 then sends a signal 326 to a gain control module 310-2 that is specific to participant device 312-2. The signal 326 instructs the gain control module 310-2 to adjust the volume for its associated participant device 312-2.

Each gain control module 310 is a combination of software and hardware that is configured to adjust an audio out signal 320 coming from a particular participant device 312. Such an adjustment is made based on a volume adjustment factor associated with that particular participant device 312. The volume adjustment factor may be, for example, a percentage adjustment. Thus, a volume adjustment factor of 50% would lower the volume by half and a volume adjustment factor of 200% would double the volume. Each participant device 312 is associated with its own gain control module 310 so that each participant device 312 can have its volume controlled separately. In some cases, a volume adjustment factor may be 100%. In other words, the adjusted audio out signal 328 has the same volume as the original audio out signal 320.

Each gain control module 310 receives an audio out signal 320 from its associated participant device 312. It then adjusts the volume of that audio out signal 320 based on the volume adjustment factor associated with its associated participant device 312. The gain control module 310 then sends the adjusted audio out signal 328 to the source selection module 304. For example, if participant device 312-2 has a volume adjustment factor that is intended to lower the volume of participant device 312-2, then the gain control module 310-2 for participant device 312-2 produces an adjusted audio out signal 328 that has been adjusted relative to a volume of the audio out signal 320 transmitted by participant device 312-2.

The source selection module 304 includes a combination of hardware and software that is configured to receive the adjusted audio output signals 328. Source selection module 304 then processes and mixes the signals 328 to produce an audio conference signal 322. The source selection module 304 then passes the audio conference signal 322 to the broadcast module 306. The source selection module 304 is also configured to determine which participant device 312 is active. In general, only one user out of the users associated with the participant devices 312 will be speaking at a given instant in time. While that one user is speaking, the source selection module 304 designates the participant device 312 associated with that one user as the active participant device 312. In some examples, the source selection module 304 sends an audio conference signal 322 that is based on only the adjusted audio out signal 328 from the active participant device 312 to the broadcast module 306.

When a different user begins speaking, then the source selection module designates the participant device 312 associated with the different user as the new active participant device 312. For example, if the user of participant device 312-1 is speaking, then the source selection module 304 designates participant device 312-1 is the active speaker. When the user associated with participant device 312-1 stops speaking and the user associated with participant device 312-3 starts speaking, then the source selection module 304 designates participant device 312-3 as the new active participant device 312. In some examples, the source selection module 304 includes logic to determine how to designate a participant device 312 as active when more than one user is speaking, by for example monitoring the signals 328 and selecting one of the signals 328 with the loudest volume.

The broadcast module 306 includes hardware, software, or a combination of both configured to receive data from the source selection module 304 and broadcast that data to the participant devices 312. The signals 322 that are broadcast to the participant devices 312 may be referred to as audio conference signals 322. Broadcast module 306 may packetize signals 322 or perform other network communication functions as appropriate.

Instead of having a control application 314, some participant devices 312, such as participant device 312-3, can utilize DTMF signaling to send commands to the conference bridge 330. DTMF commands involve producing a multi-frequency tone that represents a particular instruction. For example, during a particular call, the user of participant device 312-3 may press *7 to raise the volume of the active speaker or *8 to lower the volume of the active speaker. The DTMF detector 308 will sense a particular tone and can determine the intended command based on that tone. The DTMF detector 308 can then send the appropriate command to the control module 308. For example, during a communication session, the voice of the user associated with participant device 312-2 may be difficult to hear. While that user is speaking, the user of participant device 312-3 may use DTMF signaling that indicates a raise in volume. In response, DTMF detector 308 sends such a command to the control module 302. The control module 302 can then determine the active speaker and adjust the volume adjustment factor for the participant device 312 associated with the active speaker based on the received command from the DTMF detector 308.

In some examples, the managing participant device 312 may allow other participant devices to control the volume for different users as well. For example, while participant device 312-1 is designated as the managing participant device, participant device 312-2 may also have the ability to raise or lower the volume for specific participant devices. For example, participant device 312-2 may raise the volume for participant device 312-3 such that all participant devices hear the user of participant device 312-3 at a higher volume level.

Figure 4:
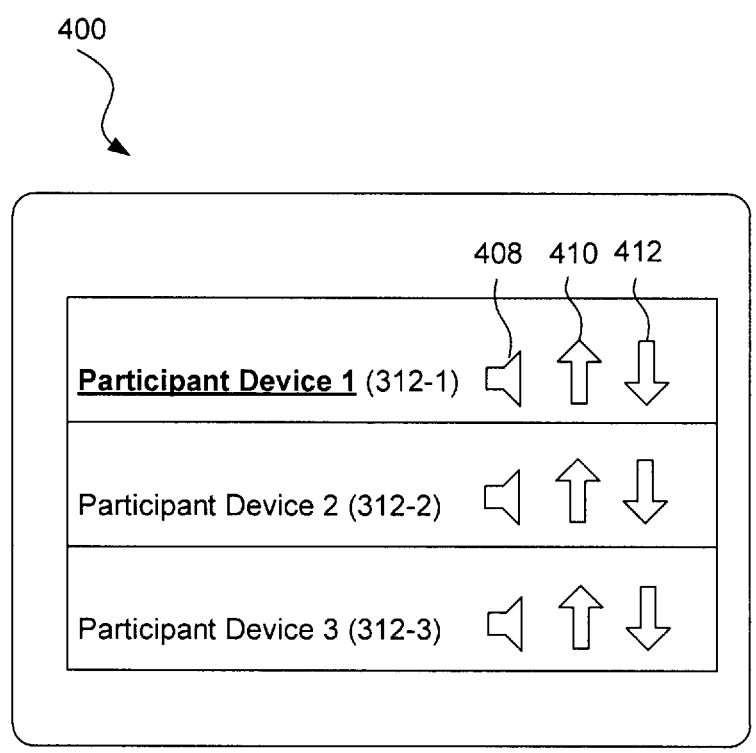
FIG. 4 is a diagram showing an illustrative component of a graphical user interface for controlling collective participant-specific volumes, according to one example of principles described herein.

FIG. 4 is a diagram showing an illustrative component of a graphical user interface (GUI) for controlling participant-specific volumes. According to the present example, the GUI 400 may be provided as part of a control application (e.g. 314, FIG. 3) of a participant device (e.g. 312, FIG. 3). Particularly, the GUI 400 may be provided to a managing participant device, in this case, participant device 312-1. In one example, GUI 400 is an active screen object that reacts to touch-based selection, cursor selection, or other appropriate interactive user input. The GUI 400 provides volume controls 408, 410, 412 for each participant device 312 of the communication session.

The volume controls may include a mute control 408, a volume down control 410, and a volume up control 412. The mute control 408 mutes the participant associated with the control. The volume down control 410 lowers the volume for the respective participant device 312. Specifically, pressing the volume down control 410 (e.g., by a finger touch gesture, a mouse click, or other input) causes the managing participant device 312 to send a command signal (e.g. 324, FIG. 3) to the control module of the conference bridge (e.g. 330, FIG. 3). The control module then reduces the volume adjustment factor associated with the appropriate participant device 312. The volume up control 412 raises the volume for the respective participant device 312. Specifically, pressing the volume up control 412 causes the managing participant device 312 to send a command signal to the control module of the conference bridge. The control module then increases the volume adjustment factor associated with the appropriate participant device 312.

Figure 5:
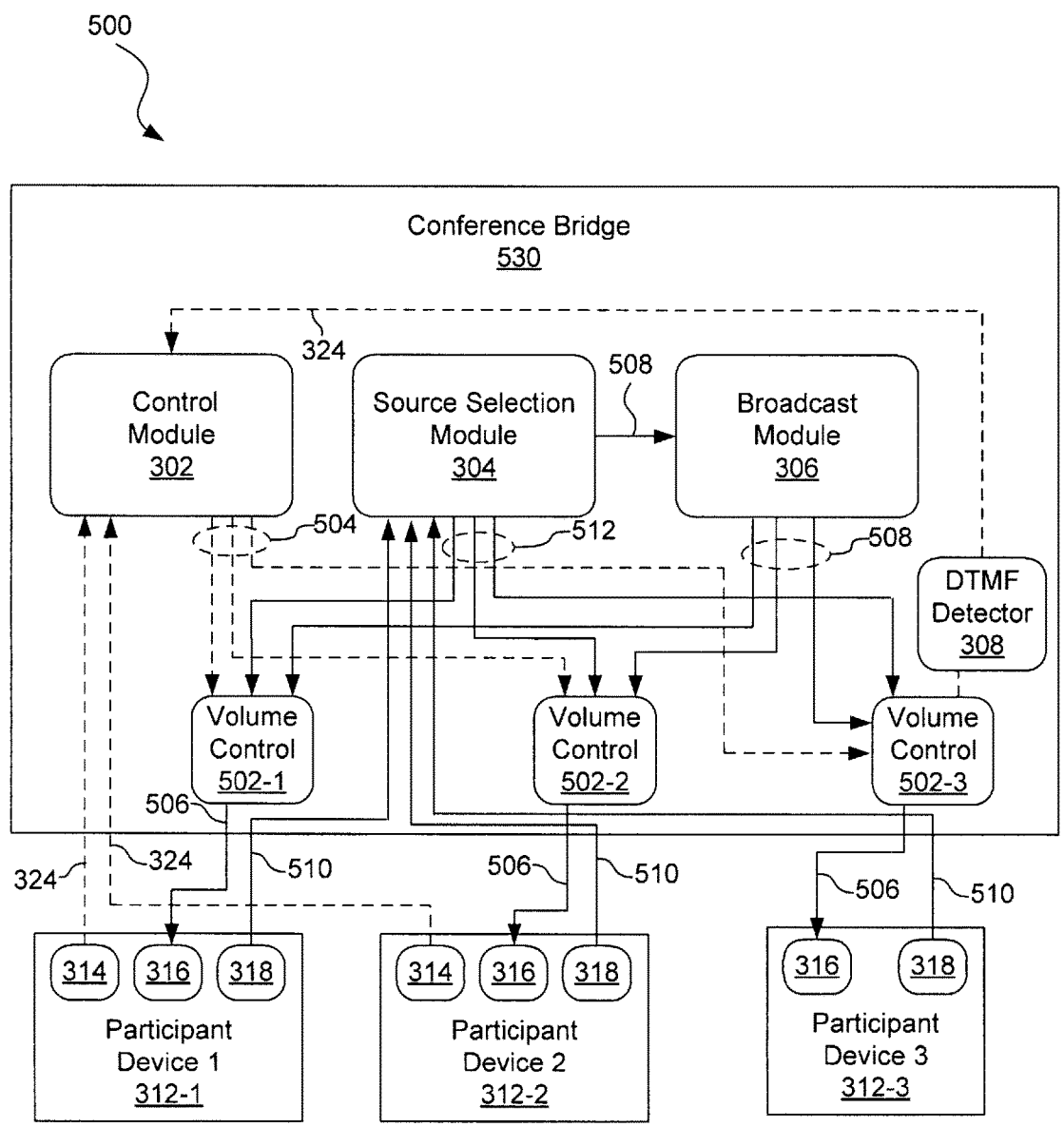
FIG. 5 is a diagram showing illustrative components of a conference bridge that provides individualized participant-specific volume control, according to one example of principles described herein.

FIG. 5 is a diagram showing illustrative components of a conference bridge 530 that provides individualized participant-specific volume control. According to the present example, a conference bridge 530 is configured to give each user the ability to control the volume of other participants such that different participants can hear other participants differently. For example, user A may wish to raise the volume for user C, but user B may not wish to do so. Using the individualized participant-specific volume control, user A and user B can adjust their respective volume control settings so that when user C speaks, user A hears user C at a higher volume than user B hears user C.

According to the present example, a volume control module 502 is associated with each participant device 312. Specifically, volume control module 502-1 is associated with participant device 312-1, volume control module 502-2 is associated with participant device 312-2, and volume control module 502-3 is associated with participant device 312-3. The volume control modules 502 include software, hardware, or a combination of both that is configured to adjust the volume based on an active speaker. In other words, each volume control module 502 receives information from the source selection module 304 that indicates the active speaker. Each volume control module 502 also receives the conference broadcast from the broadcast module 306. Each volume control module then uses its received volume adjustment factors to change the volume level of the broadcast based on the active speaker. Furthermore, each volume control module 502 performs such functions individually for each participant device 312.

Each participant device 312 is given the ability to control the volume level for each individual participant. In one example, a participant device 312 provides a set of volume adjustment factors, each volume adjustment factor specific to a different participant, including the participant device 312 that provides the volume adjustment factors. This set of volume adjustment factors is sent to the control module 302 via command signal 324. For example, participant device 312-1 provides a first set of volume adjustment factors to the control module 302. Thus, the first set of volume adjustment factors is associated with participant device 312-1. The first set of volume adjustment factors includes a first volume adjustment factor associated with participant device 312-1, a second volume adjustment factor associated with participant device 312-2, and a third volume adjustment factor associated with participant device 312-3.

Additionally, participant device 312-2 provides a second set of volume adjustment factors to the control module 302. Thus, the second set of volume adjustment factors is associated with participant device 312-2. The second set of volume adjustment factors includes a first volume adjustment factor associated with participant device 312-1, a second volume adjustment factor associated with participant device 312-2, and a third volume adjustment factor associated with participant device 312-3. Some volume adjustment factors within the first set (by device 312-1) may be different than the volume adjustment factors in the second set (by device 312-2). Some volume adjustment factors within the first set may be the same as the volume adjustment factors in the second set.

The control module 302 sends the volume adjustment factors to the volume control module 502 of the respective participant device 312 via signal 504. For example, the first set of volume adjustment factors is sent to volume control module 502-1 and the second set of volume adjustment factors is sent to volume control module 502-2. In some examples, the volume adjustment factors may be reformatted by the control module 302 for use by the volume control modules 502. For example, the volume adjustment factors may be in one format for use by the applications 314 of the participant devices 312, and a different format for use by the volume control modules 502.

As described above, the source selection module 304 is capable of determining the active participant device 312, or in other words, the participant device 312 associated with the currently speaking user. This information is conveyed to the volume control modules 502 from module 304 via signal 512. Additionally, the source selection module 304 also receives the audio signals from the participant devices 312 via signals 510. The source selection module 304 then creates a conference audio signal 508 that represents a selection of the audio signals 510. Thus, signal 508 represents a processed audio conference signal that is based on the received audio signals 510. In some examples, the conference audio signal 508 is primarily based on the audio signal 510 from the active participant device. The broadcast module 306 sends the conference audio signal 508 to each of the volume control modules 502. The volume control modules 502 then use the active speaker information from signal 512 to adjust the conference audio signals 508 to create adjusted audio conference signals 506 that are sent to the respective participant devices 312. Such adjustment is based on the volume adjustment factor associated with the active participant device 312.

For example, if participant device 312-3 is the active speaker, this information is conveyed to the volume control modules 502 by module 304. Volume control module 502-1 will adjust the volume of the sound coming from participant device 312-3 according to the volume adjustment factor associated with participant device 312-3 in the first set. Volume control module 502-2 will adjust the volume of the sound coming from participant device 312-3 according to the volume adjustment factor associated with participant device 312-3 in the second set. Thus, the user of participant device 312-1 may hear the user of participant device 312-3 at a different volume level than the user of participant device 312-2 hears the user of participant device 312-3. Put another way, module 304 determines which participant is the active speaker, and it sends metadata via signal 512 indicating which user is the active speaker. Volume control modules 502 then adjust gain according to the metadata of signal 512, where each of the individual modules 502 may provide a different gain adjustment in accordance with the received metadata.

In some examples, when more than one user is speaking at the same time, the volume of the audio conference signal can be adjusted based on an average of the volume adjustment factors associated with the users who are speaking simultaneously. For example, if the user of participant device 312-1 is speaking at the same time as the user of participant device 312-2, and the participant devices have volume adjustment factors of 50% and 70%, then the volume control module can adjust the volume of the audio conference signal by a factor of 60%.

Figure 6A:
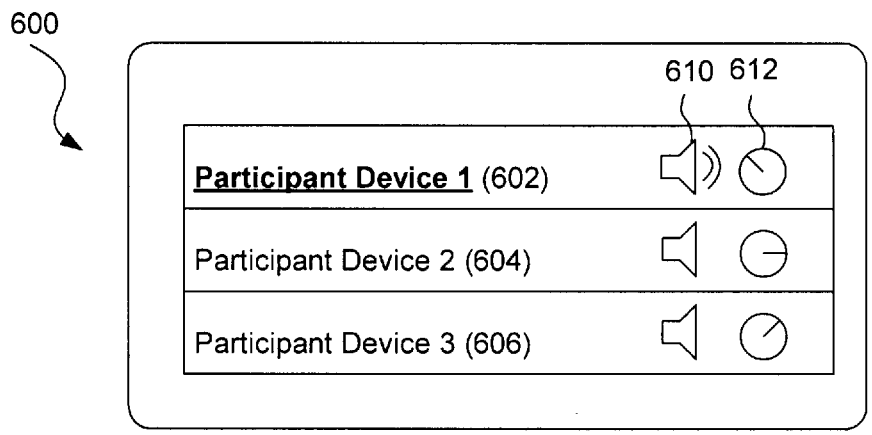
FIGS. 6A-6C are diagrams showing illustrative components of a graphical user interface for controlling individualized participant-specific volumes, according to one example of principles described herein.
Figure 6B:
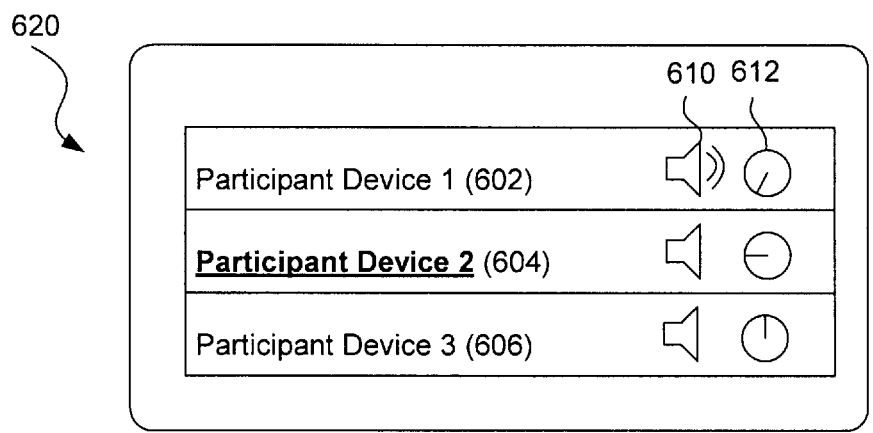
Figure 6C:
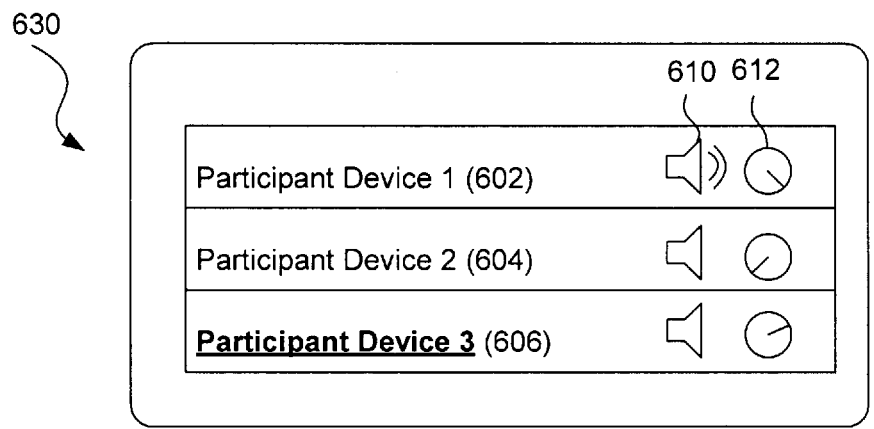

FIGS. 6A-6C are diagrams showing illustrative components of a graphical user interface for controlling individualized participant-specific volumes. According to the present example, the GUIs 600, 620, 630 may be provided as part of a control application (e.g. 314, FIG. 3) of a participant device (e.g. 312, FIG. 3). For example, GUI 600 of FIG. 6A may be provided to participant device 602, GUI 620 of FIG. 6B may be provided to participant device 604, and GUI 630 of FIG. 6C may be provided to participant device 606. The GUI may be provided as part of a control application (e.g. 314, FIG. 3). GUIs 600, 620, and 630 in some examples are active screen objects that react to touch-based selection, cursor selection, or other selection as appropriate.

The GUIs 600, 620, 630 provide volume controls 610, 612 for the respective participant devices 312 of the communication session. Control 610 is a mute control. Control 610 includes an icon that also indicates the active participant device. In this example, participant device 602 is the active participant device. Control 612 is a volume dial that allows the user to set the volume level for each individual conference participant. In one example, GUIs 600, 620, and 630 are provided on a touchscreen device and interact with finger gestures of a human user interacting with a touch screen. For instance, a human user may adjust dials 612 using a hand gesture similar to adjusting an actual knob. Adjusting the volume dial 612 changes the volume adjustment factor for the associated participant device. In one example, the volume adjustment factor is manually set by a participant using a touch interface and rotating two fingers around a volume knob control representation on the touch interface.

A user may also be able to set his or her own volume control. While a user typically does not hear his or her voice on a conference call, a participant device may record a conference call that includes the user's voice. A user may know from past experience that his or her voice is relatively loud or relatively quiet and may adjust his or her volume adjustment factor to compensate for the volume discrepancy.

Figure 7:
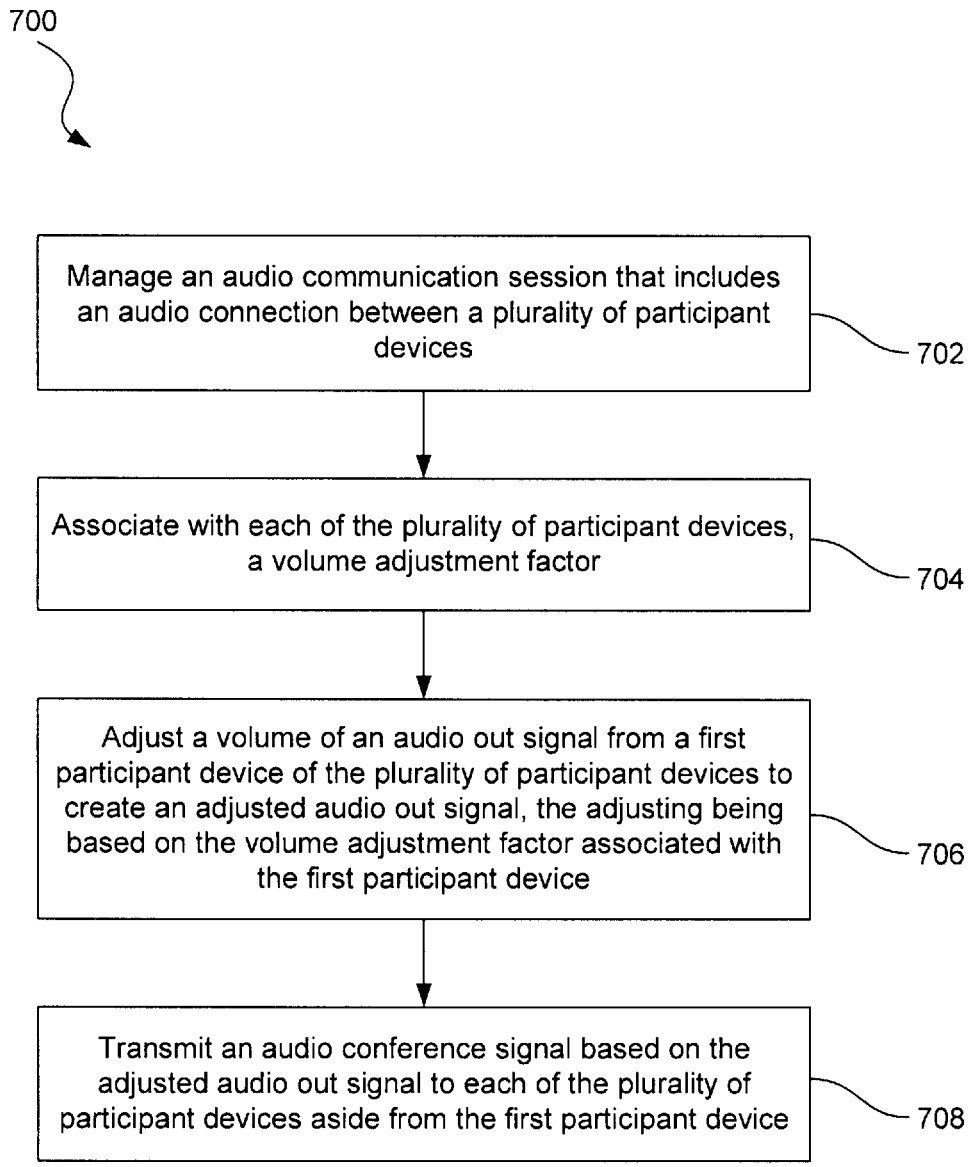
FIG. 7 is a flowchart showing an illustrative method for participant-specific volume control, according to one example of principles described herein.

FIG. 7 is a flowchart showing an illustrative method 700 for participant-specific volume control. Method 700 may be performed in some embodiments by one or more computer processors providing the functionality described above with respect to conference bridge 330 of FIG. 3. According to the present example, the method 700 includes a step 702 for managing an audio communication session that includes an audio connection between a plurality of participant devices. For example, a conference bridge can establish communication connections between a plurality of participant devices such that the users of each of those participant devices can communicate with each other on a conference call.

The method 700 further includes a step 704 for associating with each of the plurality of participant devices, a volume adjustment factor. The volume adjustment factors for each participant device may have a default setting. But, a managing participant device may have the ability to change those volume adjustment factors so that specific participants will have the volume of their voices adjusted on the conference call. Step 704 may further include receiving adjustment factor information from a participant device.

The method 700 further includes a step 706 for adjusting a volume of an audio out signal from a first participant device of the plurality of participant devices to create an adjusted audio out signal, the adjusting being based on the volume adjustment factor associated with the first participant device. This may be performed by a gain control module that is specific to the first participant device.

The method 700 further includes a step 708 for transmitting an audio conference signal based on the adjusted audio out signal to each of a subset of the plurality of participant devices. For example, the adjusted audio out signal may be sent to each participant device except for the first participant device. Because different participant devices can have different volume adjustment factors, the volume of each participant can be set so that they are substantially similar. In other words, a listener may detect only nominal changes in volume between conference participants.

Figure 8:
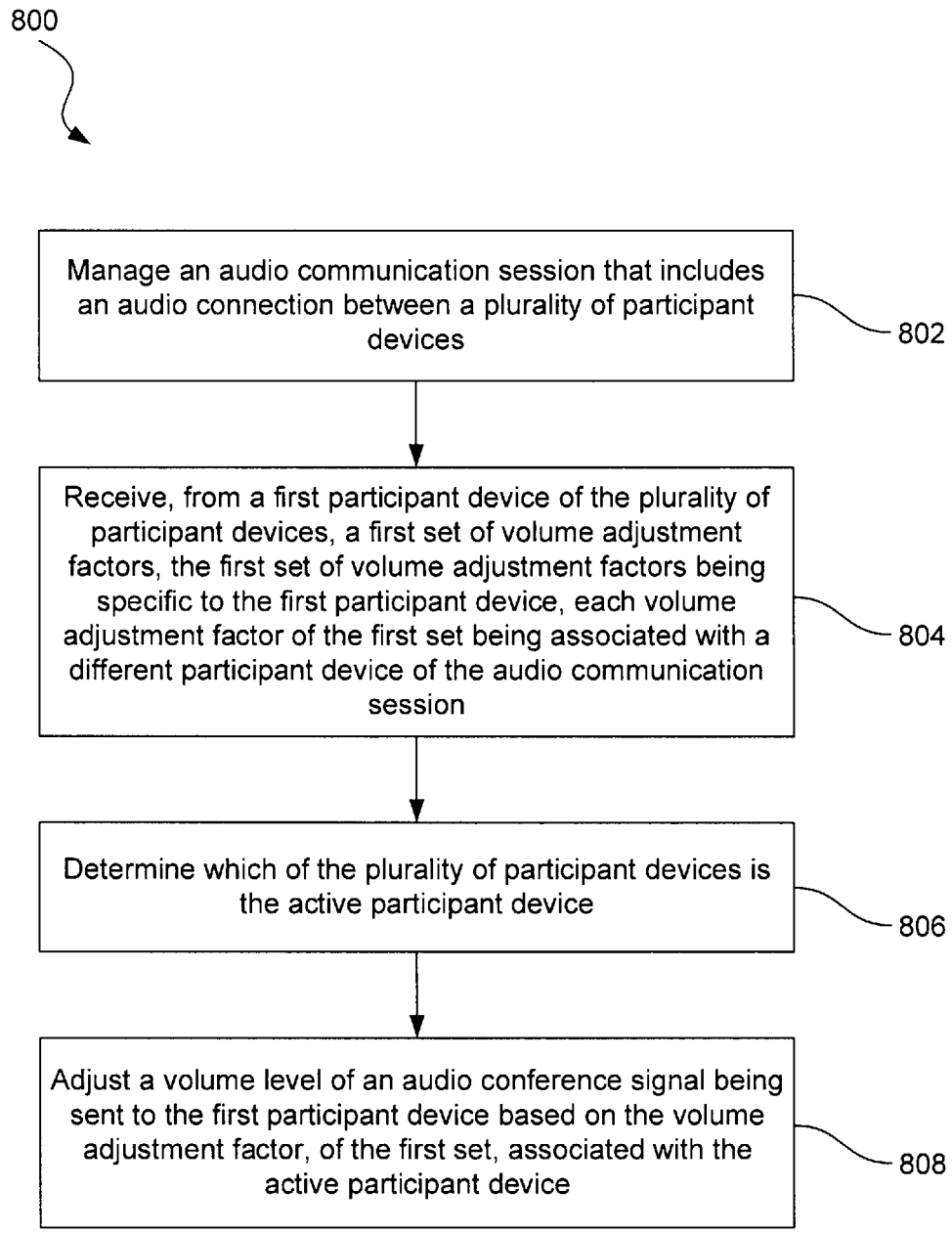
FIG. 8 is a flowchart showing an illustrative method for individualized participant-specific volume control, according to one example of principles described herein.

FIG. 8 is a flowchart showing an illustrative method 800 for individualized participant-specific volume control. Method 800 may be performed in some embodiments by one or more computer processors providing the functionality described above with respect to conference bridge 530 of FIG. 5. According to the present example, the method 800 includes a step 802 for managing an audio communication session that includes an audio connection between a plurality of participant devices. For example, a conference bridge can establish communication connections between a plurality of participant devices such that the users of each of those participant devices can communicate with each other on a conference call.

The method 800 further includes a step 804 for receiving, from a first participant device of the plurality of participant devices, a first set of volume adjustment factors, the first set of volume adjustment factors being specific to the first participant device, each volume adjustment factor of the first set being associated with a different participant device of the audio communication session. The volume adjustment factors are based on how a user of the first participant device has set the volume level for each other participant in the audio communication session.

The method 800 further includes a step 806 for determining which one of the plurality of participant devices is an active participant device. As described above, the source selection module may designate an active participant device if the user of that device is the person who is currently speaking. If more than one participant is speaking at a given instant in time, the source selection module may have methods for selecting one of the participants as the active speaker in a variety of manners.

The method 800 further includes a step 808 for adjusting a volume level of an audio conference signal being sent to the first participant device based on the volume adjustment factor, of the first set, associated with the active participant device. As described above, this may be done by a volume control module associated with the first participant device. Because each participant device has its own volume control module and provides its own set of volume adjustment factors, each participant device can hear different users at different volume levels as desired.

Some examples of processing systems described herein may include non-transitory, tangible, machine readable media that include executable code that when run by one or more processors (e.g., processor 210, 224) may cause the one or more processors to perform the processes of methods 700, 800 as described above. Some common forms of machine readable media that may include the processes of methods 700, 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   managing an audio communication session that includes an audio connection between a plurality of participant devices;
   associating with each of the plurality of participant devices, a set of volume adjustment factors, each volume adjustment factor within a set indicating a volume level for other participant devices of the plurality of participant devices;
   determining that one of the plurality of participant devices is an active participant device, the active participant device being one in which the user of that participant device is currently speaking;
   transmitting a conference audio signal to the plurality of participant devices;
   for a particular participant device, adjusting the conference audio signal to the particular participant device based on a particular volume adjustment factor within the set of volume adjustment factors associated with the particular participant device, the particular volume adjustment factor indicating a volume level for the active participant device.

2. The method of claim 1, wherein the volume adjustment factor associated with the first participant device is manually set.

3. The method of claim 2, wherein the volume adjustment factor is manually set by a participant using a touch interface and rotating two fingers around a volume knob control representation on the touch interface.

4. The method of claim 1, wherein one of the participant devices is designated as a managing participant device, the managing participant device having an ability to adjust volume adjustment factors associated with each of the participant devices.

5. The method of claim 4, further comprising, receiving an instruction from the managing participant device to adjust a volume adjustment factor for the first participant device.

6. The method of claim 5, wherein the instruction is received via one of: HyperText Transfer Protocol (HTTP), Session Initiation Protocol (SIP), Extensible Messaging and Presence Protocol (XMPP), Simple Object Access Protocol (SOAP), or Representational State Transfer (REST).

7. The method of claim 5, wherein the instruction is received via Dual-Tone Multi-Frequency (DTMF) signaling.

8. The method of claim 7, wherein receipt of a DTMF command to raise or lower volume is applied to the volume adjustment factor associated with a currently active participant device.

9. The method of claim 1, wherein the volume adjustment factors for each of the participant devices are configured to bring audio levels from each of the participant devices to a substantially similar level.

10. The method of claim 1, wherein one of the participant devices is one of a phone, a smartphone, a laptop, or a tablet.

11. A method performed by a computing system, the method comprising:
   managing an audio communication session that includes an audio connection between a plurality of participant devices;
   receiving, from a first participant device of the plurality of participant devices, a first set of volume adjustment factors, the first set of volume adjustment factors being specific to the first participant device, each volume adjustment factor of the first set indicating a volume level for a different participant device of the audio communication session;
   determining which of the plurality of participant devices is an active participant device the active participant device being one in which the user is currently speaking; and
   adjusting a volume level of a conference audio signal being sent to the first participant device based on the volume adjustment factor, of the first set, indicating a volume level for the active participant device.

12. The method of claim 11, further comprising, receiving from a second participant device of the plurality of participant devices, a second set of volume adjustment factors, the second set of volume adjustment factors being specific to the second participant device, each volume adjustment factor of the second set being associated with a different participant device of the audio communication session, the second set being different from the first set.

13. The method of claim 12, further comprising adjusting a volume level of the conference audio signal being sent to the second participant device based on the volume adjustment factor, of the second set, associated with the active participant device.

14. The method of claim 11, further comprising, receiving from the first participant device, an updated first set of volume adjustment factors, the revised first set of volume adjustment factor having at least one updated volume adjustment factor.

15. The method of claim 11, wherein the first set of volume adjustment factors are manually set by a user of the participant device associated with the first set of volume adjustment factors.

16. The method of claim 15, wherein the volume adjustment factor is manually set by a participant using a touch interface and rotating two fingers around a volume knob control representation on the touch interface.

17. A conference bridge comprising:
   a processor; and
   a memory with machine readable instructions that when executed by the processor, cause the system to:
      receive, for each participant device of a plurality of participant devices engaged in a communication session, a set of volume adjustment factors, each volume adjustment factor within the set defining volume adjustment for a different participant device within the communication session; and
      determine that one of the plurality of participant devices is an active participant device, the active participant device being one in which the user of that participant device is currently speaking;
      for a particular participant device of the plurality of participants device, adjust a volume of audio out signals sent to the particular participant device to create adjusted audio out signals, the adjusted audio signals based on a particular volume adjustment factor of the set of volume adjustment factors for the particular participant device, the particular volume adjustment factor defining volume adjustment for the active participant;
      receive the adjusted audio out signals; and
      transmit, as audio in signals, a conference audio signal based on the adjusted audio out signals to each of the plurality of participant devices.

18. The conference bridge of claim 17, wherein the volume adjustment factors are controllable by a managing participant device of the plurality of participant devices.

19. The conference bridge of claim 17, further comprising a Dual-Tone Multi-Frequency (DTMF) detector module configured to detect DTMF commands within an audio out signal of one of the participant devices, the DTMF commands indicating a change to one of the volume adjustment factors.

20. The conference bridge of claim 17, wherein the volume adjustment factors are controllable by each conference participant.

* * * * *